UNITED STATES PATENT OFFICE.

JOSEPH WILLIAMS, OF SHARPSBURG, PENNSYLVANIA.

IMPROVEMENT IN LUBRICATING COMPOUNDS.

Specification forming part of Letters Patent No. 132,379, dated October 22, 1872.

*To all whom it may concern:*

Be it known that I, JOSEPH WILLIAMS, of Sharpsburg, in the county of Allegheny and State of Pennsylvania, have invented a certain new and useful Improvement in Lubricator; and I do hereby declare that the following is a full, clear, and exact description of the mode of preparing the same.

The nature of my invention consists in a lubricator composed of tallow or other grease, sulphur, lime, water, borax, black lead, white lead, resin, and oil, prepared in about the proportions and mixed together so as to form a homogeneous compound.

To enable others skilled in the art to make my lubricating compound, I will proceed to describe more fully the mode of preparing it.

I take five parts of borax and dissolve it in fifteen parts of water, melt forty-five parts of tallow or other grease, bringing it and the borax-water to a temperature of about 200° Fahrenheit. I then add five parts of flour of sulphur, five parts of lime, ten parts of finely-pulverized black lead, four parts of white lead, six parts of resin, and five parts of oil. All of these ingredients above named, in about the proportions specified, are brought to a temperature of about 250° of heat, care being taken to keep stirring and agitating the ingredients as they are severally added to the melted grease and borax-water. After they have been thoroughly commingled the heated compound is removed from the fire and the stirring continued until the mass is sufficiently cool to congeal. It is then put up in suitable tin boxes for sale and use.

The lubricating compound hereinbefore described will be found useful for carriages, railway-car axles, and other things requiring lubrication, and will be found free from grit, very durable, and cheap as a lubricating compound.

Having thus described my improvement, what I claim as of my invention is—

A lubricating compound consisting of the ingredients herein named, prepared in the manner and in about the proportions specified.

JOSEPH WILLIAMS.

Witnesses:
   A. C. JOHNSTON,
   JAMES J. JOHNSTON.